(12) United States Patent
Inoue

(10) Patent No.: US 6,621,249 B2
(45) Date of Patent: Sep. 16, 2003

(54) BATTERY CHARGE AND DISCHARGE SYSTEM FOR INHIBITING OR PERMITTING CHARGING OF AN AUXILARY BATTERY

(75) Inventor: Hitoshi Inoue, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/069,339

(22) PCT Filed: Jun. 26, 2001

(86) PCT No.: PCT/JP01/05477
§ 371 (c)(1),
(2), (4) Date: Feb. 25, 2002

(87) PCT Pub. No.: WO02/01695
PCT Pub. Date: Jan. 3, 2002

(65) Prior Publication Data
US 2002/0121879 A1 Sep. 5, 2002

(30) Foreign Application Priority Data
Jun. 27, 2000 (JP) ....................................... 2000-192368

(51) Int. Cl.[7] ............................................... H01M 10/46
(52) U.S. Cl. ....................................................... 320/135
(58) Field of Search .................................. 320/103, 124, 320/127, 132, 135, 137

(56) References Cited

U.S. PATENT DOCUMENTS 5,243,269 A    9/1993   Katayama et al.

FOREIGN PATENT DOCUMENTS

| | | |
|---|---|---|
| GB | 2 341 258 | 3/2000 |
| JP | 4-193033 | 7/1992 |
| JP | 5-161281 | 6/1993 |
| JP | 7-241047 | 9/1995 |
| JP | 2988918 | 10/1999 |
| JP | 2000-078759 | 3/2000 |

Primary Examiner—Edward H. Tso
(74) Attorney, Agent, or Firm—Wenderoth, Lind & Ponack, L.L.P.

(57) ABSTRACT

The present invention provides a battery charge and discharge system whereby a cost reduction can be achieved due to a reduction in count of components constituting the system, and a battery charge and discharge system which controls the charge of an auxiliary battery installed separately from a main battery, has a slave with the auxiliary battery mounted thereon, which is communicably connected with a master and controls the permission/inhibition of the charging of the auxiliary battery based on the judgments of whether or not the master is in sleep mode.

13 Claims, 7 Drawing Sheets

BATTERY CHARGE AND DISCHARGE SYSTEM FOR INHIBITING OR PERMITTING CHARGING OF AN AUXILARY BATTERY

TECHNICAL FIELD

The present invention relates to a battery charge and discharge system and, more particularly, to a battery charge and discharge system of an apparatus on which an auxiliary battery is mounted.

BACKGROUND ART

As an apparatus having an auxiliary battery mounted thereon, which charges and discharges the auxiliary battery, a vehicle security system is exemplified.

FIG. 7 is a block diagram schematically showing the principal part of a conventional security system. A master 1A as a security device side comprises a microcomputer 1a to perform various types of control. Connected to input terminals of the microcomputer 1a are an ignition switch 2 to detect whether the position of an ignition key is ON or OFF, a key insert switch 3 to detect whether or not the ignition key is inserted into a key cylinder of an engine, a door courtesy switch 4 to detect whether doors are open or closed, a lock position switch 5 to detect whether the doors are locked or unlocked, and an intrusion detecting means 6 to detect unfair intrusion into a car.

The microcomputer 1a of the master 1A and a microcomputer 2a of a slave 2A are connected through a communication line 9. A siren, for example, as the slave side has the microcomputer 2a to perform various types of control. An alarm generating circuit 11 is connected to an output terminal of the microcomputer 2a. The alarm generating circuit 11 sounds an alarm based on a detected signal from the intrusion detecting means 6. An ignition detecting circuit 12 is connected to an input terminal of the microcomputer 2a, and an ignition key switch 13 is connected through a signal wiring 14 to the ignition detecting circuit 12. One end of an auxiliary battery 15 is connected to the microcomputer 2a in order to inform the charge state, while to the other end thereof, a main battery 7 is connected through a switch circuit 16 and a feeder line 8. The main battery 7 is connected through the feeder line 8 to both the microcomputer 1a of the master 1A and the microcomputer 2a of the slave 2A.

Charging of the auxiliary battery 15 mounted on the siren as the slave 2A in the above construction has been conducted as follows.

In the slave 2A, an ON/OFF signal of the ignition key switch 13 is captured through the signal wiring 14 by the ignition detecting circuit 12, which then outputs the detected signal to the microcomputer 2a. When the ignition key switch 13 is judged to be ON, the microcomputer 2a judges the engine to be in action and sends a signal for making the switch circuit 16, comprising a switching element such as a transistor, ON to the switch circuit 16 in order to charge the auxiliary battery 15. When the switch circuit 16 becomes ON, the charge of the auxiliary battery 15 is carried out by the main battery 7 through the feeder line 8.

On the other hand, when the ignition key switch 13 is judged to be OFF, the microcomputer 2a does not judge the engine to be in action and sends a signal for making the switch circuit 16 OFF to the switch circuit 16 in order to inhibit the charge of the auxiliary battery 15. When the switch circuit 16 becomes OFF, the charge of the auxiliary battery 15 by the main battery 7 through the feeder line 8 is inhibited. As described above, the charging of the auxiliary battery 15 has been performed based on the ON/OFF state of the ignition key switch 13 directly detected by the slave 2A.

In the above-described conventional battery charge and discharge system, the signal wiring 14 for capturing the ON/OFF signal from the ignition key switch 13 on the slave side is required. In addition, the slave side is required to have the detecting circuit 12 for detecting the ON/OFF state of the ignition key switch 13. Therefore, the count of components constituting the slave is large, resulting in a high cost.

DISCLOSURE OF INVENTION

The present invention was developed in order to solve the above problem, and it is an object of the present invention to provide a battery charge and discharge system, wherein instead of making a slave directly judge the permission/inhibition of charging of an auxiliary battery mounted on the slave, the charging of the auxiliary battery is carried out through the use of a communication means between a master and the slave, so that the count of components such as a signal wiring and a detecting circuit can be reduced, leading to a reduction in cost.

In order to achieve the above object, a battery charge and discharge system (1) according to the present invention is characterized by a battery charge and discharge system controlling the charge and discharge of an auxiliary battery installed separately from a main battery, wherein a master and a slave with the auxiliary battery mounted thereon are communicably connected, the system comprising a first judging means to judge whether or not the master is in sleep mode, a charge inhibit means to inhibit the charging of the auxiliary battery of the slave when the first judging means judges the master to be in sleep mode, and a charge permit means to permit the charging of the auxiliary battery of the slave when the first judging means does not judge the master to be in sleep mode.

Using the above battery charge and discharge system (1), the slave can control the permission/inhibition of the charging of the auxiliary battery based on the judgment of whether or not the master is in sleep mode. Therefore, a signal wiring and a signal detecting circuit component for detecting signals, conventionally required for directly judging the state of an ignition key switch on the slave side, become needless, so that the count of components constituting the system can be decreased, resulting in a cost reduction.

A battery charge and discharge system (2) according to the present invention is characterized by a battery charge and discharge system controlling the charge and discharge of an auxiliary battery installed separately from a main battery, wherein a master and a slave with the auxiliary battery mounted thereon are communicably connected, the system comprising a second judging means to judge whether or not the sleep conditions of the master are satisfied, a charge inhibit means to inhibit the charging of the auxiliary battery of the slave when the second judging means judges the sleep conditions of the master to be satisfied, and a charge permit means to permit the charging of the auxiliary battery of the slave when the second judging means does not judge the sleep conditions of the master to be satisfied.

Using the above battery charge and discharge system (2), the slave can control the permission/inhibition of the charging of the auxiliary battery based on the judgment of whether or not the sleep conditions of the master are satisfied.

Therefore, a signal wiring and a signal detecting circuit component for detecting signals, conventionally required for directly judging the state of an ignition key switch on the slave side, become needless, so that the count of components constituting the system can be decreased, resulting in a cost reduction. Moreover, the charge can be inhibited at an earlier timing before the master goes into sleep mode, and at the wake-up time of the master, the charging of the auxiliary battery is not permitted until an operation condition such as an event occurs. As a result, the power consumption of the main battery can be reduced.

A battery charge and discharge system (3) according to the present invention is characterized by a battery charge and discharge system controlling the charge and discharge of an auxiliary battery installed separately from a main battery, wherein a master and multiple nodes are connected through a communication line, and the master and a slave with the auxiliary battery mounted thereon are communicably connected, the system comprising a third judging means to judge whether or not at least one of the nodes is in sleep mode, a charge inhibit means to inhibit the charging of the auxiliary battery of the slave when the third judging means judges at least one of the nodes except for the master to be in sleep mode, and a charge permit means to permit the charging of the auxiliary battery of the slave when the third judging means judges none of the nodes except for the master to be in sleep mode.

Using the above battery charge and discharge system (3), the slave receives the judgment of whether or not the nodes connected through the communication line with the master are in sleep mode through the communication line and controls the permission/inhibition of the charging of the auxiliary battery. Therefore, a signal wiring and a signal detecting circuit component for detecting signals, conventionally required for directly judging the state of an ignition key switch on the slave side, become needless, so that the count of components constituting the system can be reduced, resulting in a cost reduction. Moreover, by receiving at an early stage a signal indicating that the communication system including the multiple nodes is shifting to sleep mode while the master itself is in action, the charging of the auxiliary battery can be inhibited at an earlier timing. And at the wake-up time of the master, the charging of the auxiliary battery is not permitted until all of the nodes go into action. As a result, the power consumption of the main battery can be reduced.

A battery charge and discharge system (4) according to the present invention is characterized by the auxiliary battery, which is used as a driving power when the electric power supply from the main battery is cut off in any of the battery charge and discharge systems (1)–(3)

Using the above battery charge and discharge system (4), even if the electric power supply is cut off by causing the main battery to be removed, or the feeder line from the main battery to be cut, the driving power can be supplied from the auxiliary battery, resulting in maintaining the slave in action.

BEST MODE FOR CARRYING OUT THE INVENTION

The preferred embodiments of the battery charge and discharge system according to the present invention are described below by reference to the Figures of the drawings.

Figure 1:
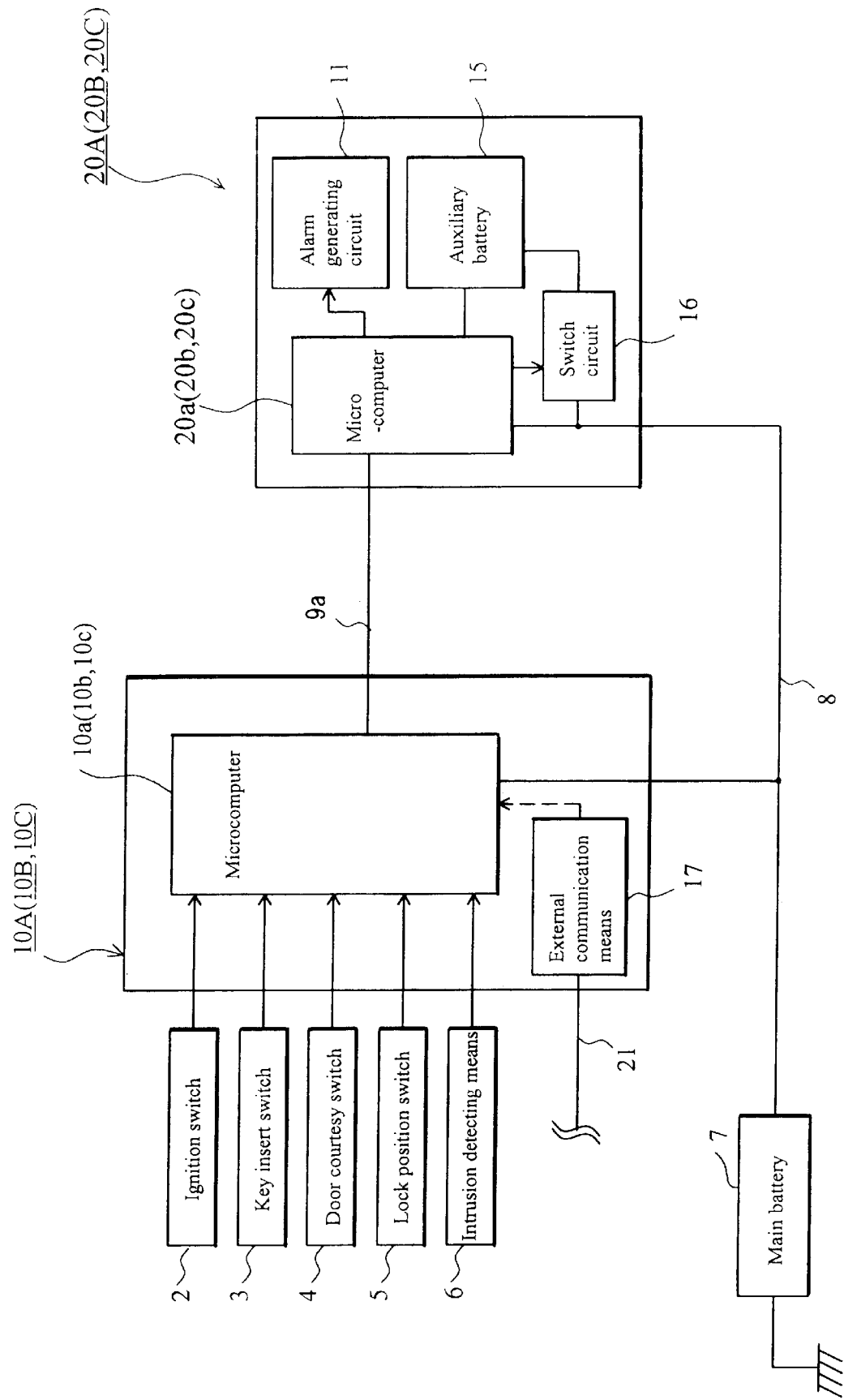
FIG. 1 is a block diagram schematically showing the principal part of a battery charge and discharge system according to embodiments (1)–(3) of the present invention.
Figure 7:
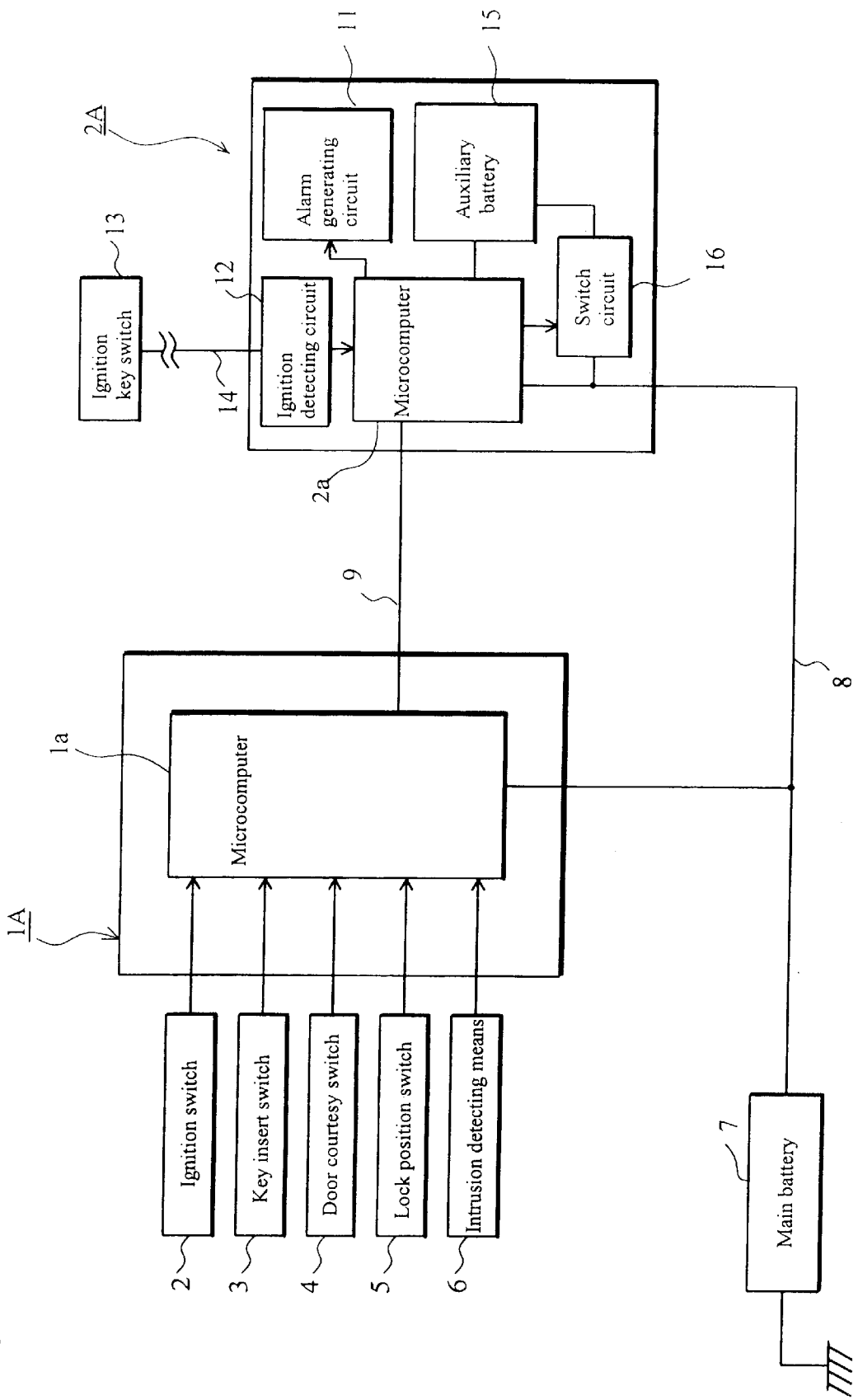
FIG. 7 is a block diagram schematically showing the principal part of a conventional battery charge and discharge system.

FIG. 1 is a block diagram schematically showing the principal part of a battery charge and discharge system according to an embodiment (1). Here, the same marks are affixed to the components similar to those of the conventional battery charge and discharge system shown in FIG. 7, the description of which will not be repeated.

A microcomputer 10a of a master 10A and a microcomputer 20a of a slave 20A are connected through a communication line 9a. The master 10A comprises the microcomputer 10a, and to input terminals of the microcomputer 10a, each of an ignition switch 2, a key insert switch 3, a door courtesy switch 4, a lock position switch 5, and an intrusion detecting means 6 are connected so that each detected signal is input thereto. The slave 20A as a siren comprises the microcomputer 20a, an auxiliary battery 15, a switch circuit 16, and an alarm generating circuit 11. And the electric power from a main battery 7 is supplied to the microcomputer 10a of the master 10A, the microcomputer 20a of the slave 20A, and the auxiliary battery 15 through a feeder line 8.

The battery charge and discharge system according to the embodiment (1) is operated as follows.

When the battery charge and discharge system shifts to sleep mode, it is detected through the ignition switch 2 that the ignition key switch was made OFF; by a detected signal from the key insert switch 3, it is detected that the ignition key was removed from the key cylinder; by a detected signal from the door courtesy switch 4, it is detected that all of the doors are closed; and by a detected signal from the lock position switch 5, it is detected that the door lock mechanisms are in the locked state, leading to the satisfaction of the conditions for shifting to alert mode. Then, the master 10A shifts to the alert mode for monitoring and guarding against unfair intrusion into the car. When the master 10A goes into the alert mode, the microcomputer 10a thereof shifts to the sleep mode (low electric current consumption mode) in order to lower the power consumption to a minimum.

In the slave 20A, when the microcomputer 20a receives a signal indicating that the master 10A is in sleep mode through the communication line 9a, a control signal for inhibiting the charge of the auxiliary battery 15 is sent from the microcomputer 20a to the switch circuit 16 in order to cut off the feeder line from the main battery 7 to the auxiliary battery 15, so that the charge of the auxiliary battery 15 is inhibited. Then, the microcomputer 20a on the slave 20A side also shifts to sleep mode.

On the other hand, in order that the master 10A in the sleep mode may shift to wake-up mode (normal electric current consumption mode), it is conditioned that a door should be unlocked with a key in the normal way, and that an ON signal of the ignition switch 2 should be input to the microcomputer 10a. When these conditions are met, the master 10A shifts to the wake-up mode from the sleep mode. When the microcomputer 20a of the slave 20A receives a signal indicating that the master 10A is in the wake-up mode through the communication line 9a, the microcomputer 20a thereof also shifts to wake-up mode and sends a signal for permitting the charge of the auxiliary battery 15 to the switch circuit 16, which makes the switch circuit 16 ON so as to enable the charge of the auxiliary battery 15 by the main battery 7.

Figure 2:
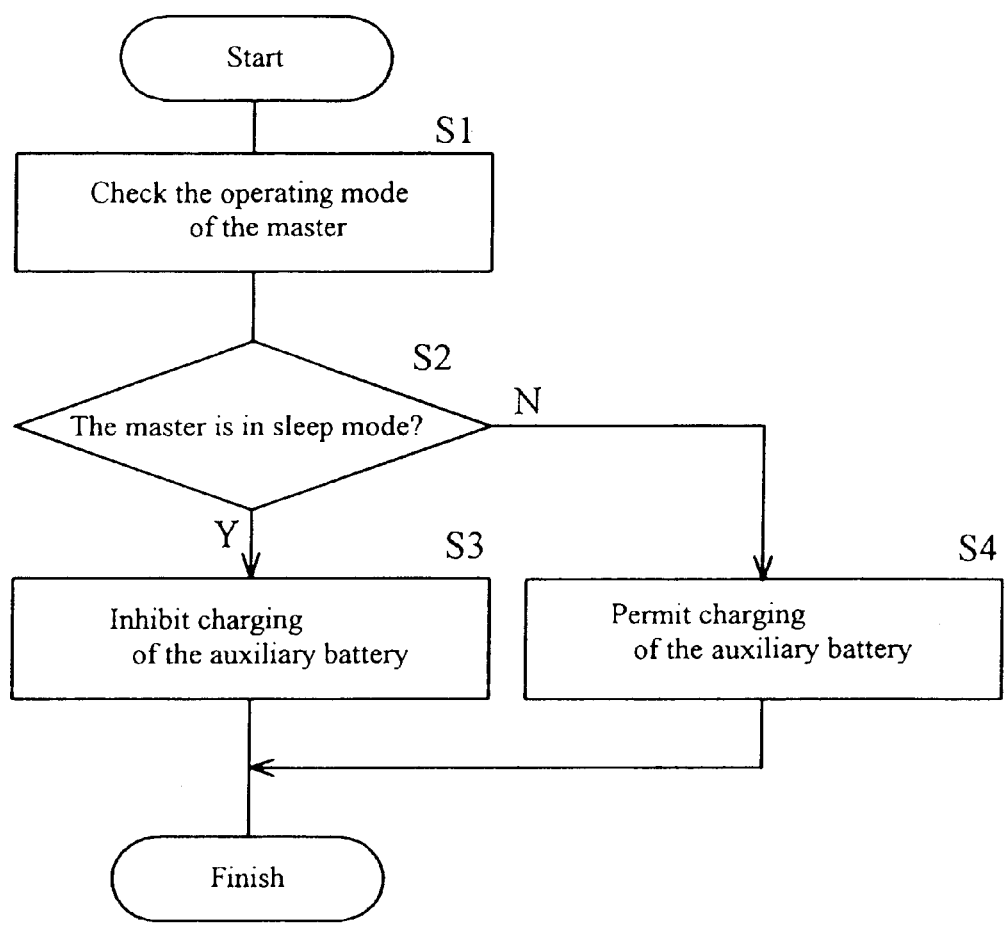
FIG. 2 is a flow chart showing the operation of a microcomputer in a battery charge and discharge system according to the embodiment (1)

The control operation of the charging of the auxiliary battery 15 by the microcomputer 20a in that battery charge and discharge system is described by reference to a flow chart shown in FIG. 2.

In Step 1, in order to check the operating mode of the master 10A, the microcomputer 20a captures a signal from the microcomputer 10a through the communication line 9a. In Step 2, it judges whether or not the master 10A is in sleep mode. When it judges the master 10A to be in sleep mode, it goes to Step 3, wherein the inhibition of the above-described charge of the auxiliary battery 15 is conducted and then finished. On the other hand, when it does not judge the master 10A to be in sleep mode in Step 2, it goes to Step 4, wherein the permission of the above-described charge of the auxiliary battery 15 is conducted and then finished.

Figure 6:
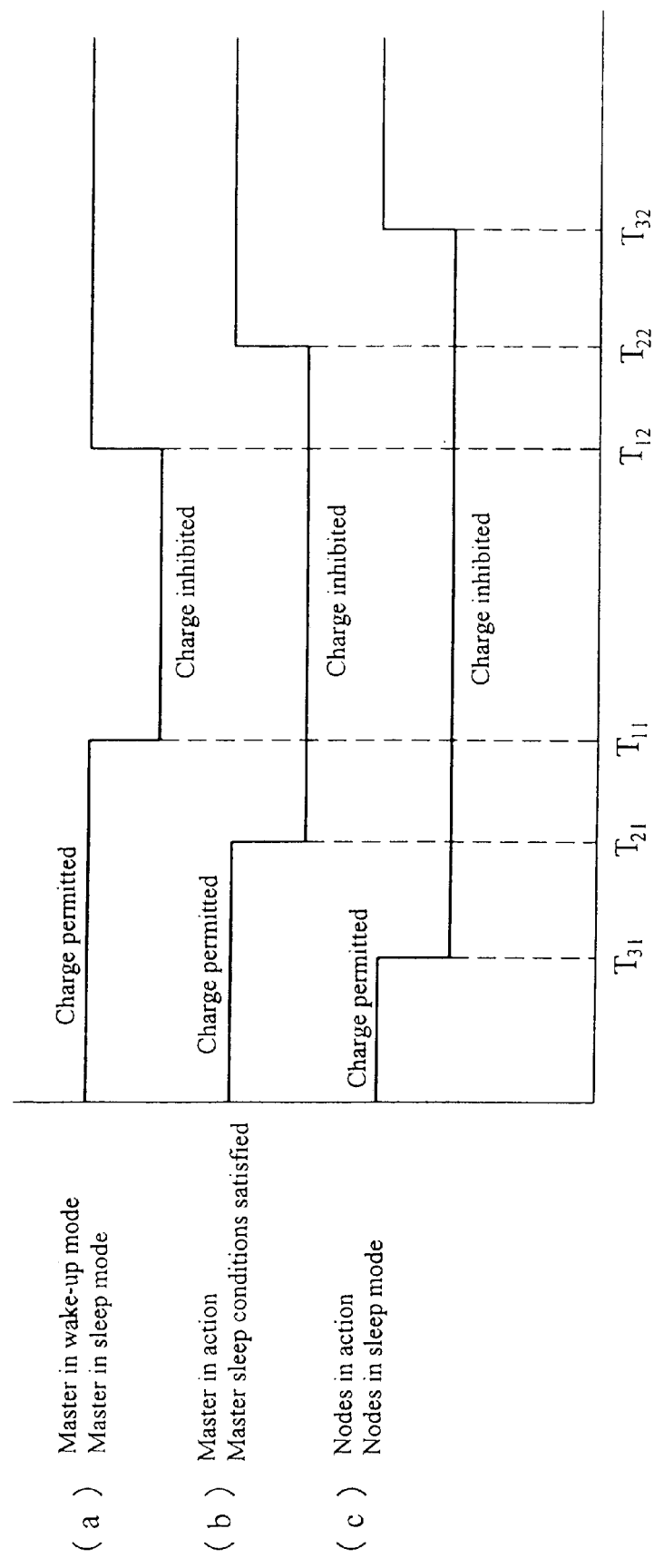
FIG. 6 is a timing chart showing the permission/inhibition control of charging of an auxiliary battery in each of the battery charge and discharge systems according to the embodiments (1)–(3)

The timing chart of the permission/inhibition of the charging of the auxiliary battery 15 in this case is shown in FIG. 6(a). $T_{11}$ is the instant when the master 10A was judged to be in sleep mode, since when the charge of the auxiliary battery 15 has been inhibited. And $T_{12}$ is the instant when the master 10A was judged to have shifted from the sleep mode to wake-up mode, since when the charge of the auxiliary battery 15 has been permitted.

Using the battery charge and discharge system according to the embodiment (1), the slave 20A captures a signal indicating the judgment of whether or not the master 10A is in sleep mode through the communication line 9a, whereby it can control the permission/inhibition of the charging of the auxiliary battery 15. Therefore, a wiring for capturing signals (a signal wiring 14 shown in FIG. 7) and a signal detecting circuit component for detecting signals (an ignition detecting circuit 12 shown in FIG. 7), conventionally required for directly judging the state of the ignition key switch on the slave 20A side, become needless. As a result, the count of components constituting the system can be decreased, leading to a cost reduction.

A battery charge and discharge system according to an embodiment (2) is described below.

The hardware construction of the battery charge and discharge system according to the embodiment (2) is the same as that of the battery charge and discharge system shown in FIG. 1, which is not described here.

The different point of the battery charge and discharge system according to the embodiment (2) from the battery charge and discharge system according to the embodiment (1) is that the charge of an auxiliary battery 15 is inhibited at an earlier stage than in the battery charge and discharge system according to the embodiment (1). When a master shifts to sleep mode, usually the master shifts to the sleep mode several seconds after the conditions for sleep were met. But in the case of the embodiment (2), at the stage where the conditions for sleep of a master 10B were met, that signal is captured by a microcomputer 20b of a slave 20B through a communication line 9a, and the charge of the auxiliary battery 15 is inhibited.

Figure 3:
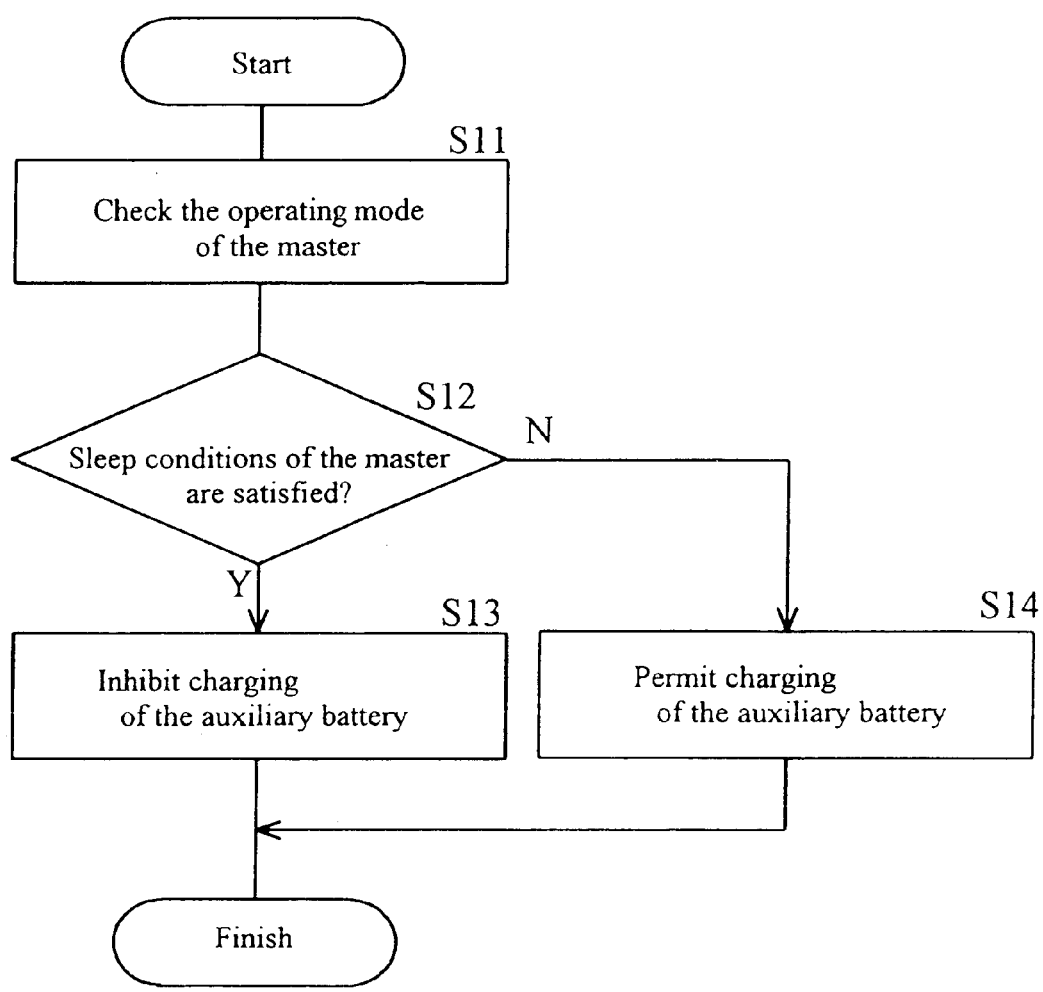
FIG. 3 is a flow chart showing the operation of a microcomputer in a battery charge and discharge system according to the embodiment (2)

The control operation of the charging of the auxiliary battery 15 by the microcomputer 20b in the battery charge and discharge system according to the embodiment (2) is described by reference to a flow chart shown in FIG. 3.

In Step 11, in order to check the operating mode of the master 10B, the microcomputer 20b captures a signal from the microcomputer 10b through the communication line 9a. In Step 12, it judges whether or not the sleep conditions of the master 10B are satisfied. It may be set so that it can judge whether or not the sleep conditions are satisfied from a detected signal from a key insert switch 3 and the like as necessary. When it judges the sleep conditions to be satisfied in Step 12, it goes to Step 13, wherein the inhibition of the charge of the auxiliary battery 15 is conducted and then finished. On the other hand, when it does not judge the sleep conditions to be satisfied in Step 12, it goes to Step 14, wherein the permission of the charge of the auxiliary battery 15 is conducted and then finished.

The timing chart of the permission/inhibition of the charging of the auxiliary battery 15 in this case is shown in FIG. 6(b). $T_{21}$ is the instant when the sleep conditions of the master 10B were judged to be satisfied, since when the charge of the auxiliary battery 15 has been inhibited. There is a time lag of about several seconds between the instant $T_{21}$ and the instant $T_{11}$ when the master 10A went into sleep mode in FIG. 6(a). And $T_{22}$ is the instant when the master 10B shifted from the sleep mode to wake-up mode and an operation condition occurred to the microcomputer 10b, which made it impossible for the master 10B to go into sleep mode, since when the charge of the auxiliary battery 15 has been permitted.

Using the battery charge and discharge system according to the embodiment (2), the slave 20B captures the judgment of whether or not the sleep conditions of the master 10B are satisfied through the communication line 9a, and controls the permission/inhibition of the charging of the auxiliary battery 15 based on the judgment. Therefore, a wiring for capturing signals (a signal wiring 14 shown in FIG. 7) and a signal detecting circuit component for detecting signals (an ignition detecting circuit 12 shown in FIG. 7), conventionally required for directly judging the state of an ignition key switch on the slave side, become needless. As a result, the count of components constituting the system can be decreased, leading to a cost reduction. Moreover, the charging can be inhibited at an earlier timing before the master goes into sleep mode, while at the wake-up time of the master 10B, the power consumption of the main battery 7 can be further reduced, since the charging of the auxiliary battery 15 is not permitted until an operation condition such as an event occurs to the microcomputer 10b.

A battery charge and discharge system according to an embodiment (3) is described here.

Figure 4:
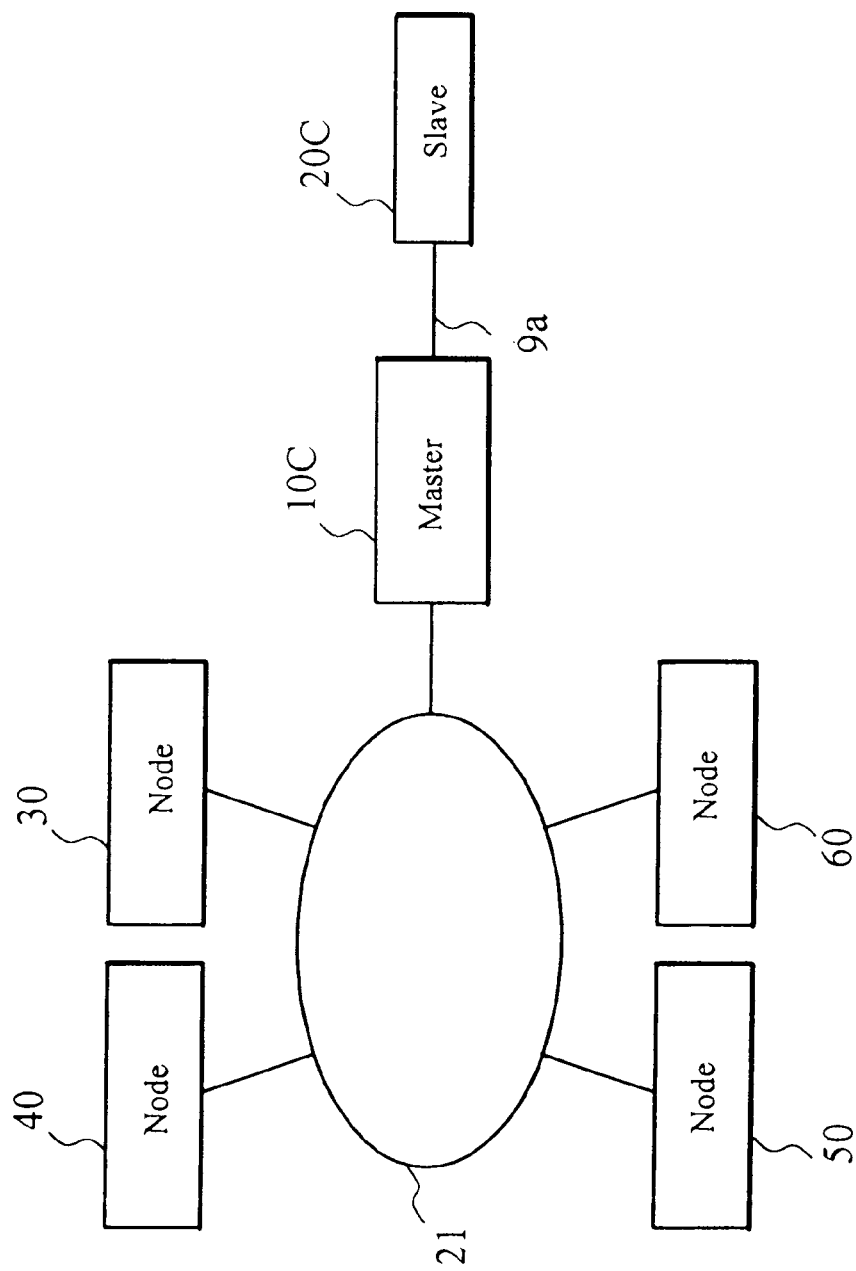
FIG. 4 is a block diagram schematically showing an example of the overall construction of a battery charge and discharge system according to the embodiment (3)

FIG. 4 is a block diagram showing an example of the overall construction of a battery charge and discharge system according to the embodiment (3). The hardware construction of a master 10C and a slave 20C is the same as that of the master 10A and the slave 20A according to the embodiment (1) shown in FIG. 1 except for an external communication means 17 additionally arranged to input and output signals to and from a communication line 21 for communicating with multiple nodes, which is not described in detail here.

In the battery charge and discharge system according to the embodiment (3), nodes 30–60 and the master 10C, mounted on a vehicle, are connected in the form of a ring through the communication line 21, resulting in the construction of a vehicle LAN which enables them to share information with one another by communication. As an access method for controlling the data transmission by the ring-type communication line 21, a token passing method is adopted. Here, the access method for communication is not limited to this embodiment, and depending on the connecting method of the communication line with each node (of a bus type, a ring type, a star type and the like), an optimum access method may be selected and adopted as necessary.

Each node 30, 40, 50 or 60 is not specifically limited, and each node has only to be mounted on a vehicle, control the system using a microcomputer, and have a transmitting-receiving function for communication. For example, as the nodes 30, 40, 50 and 60, an ECU for engine control, an ECU for body control, an ECU for seat control, and an ECU for meter control can be adopted, respectively.

Figure 5:
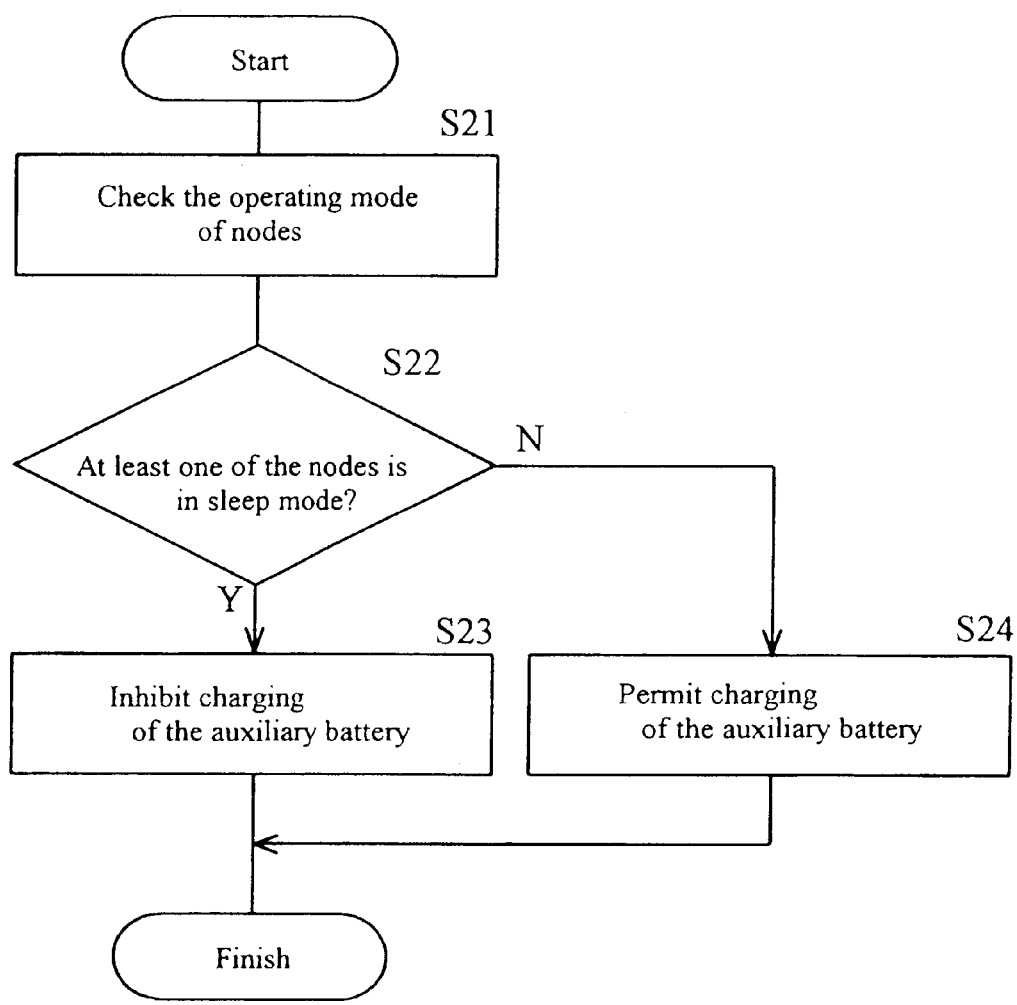
FIG. 5 is a flow chart showing the operation of a microcomputer in the battery charge and discharge system according to the embodiment (3)

The control operation of the charging of the auxiliary battery 15 conducted by the microcomputer 20c (FIG. 1) in the battery charge and discharge system according to the embodiment (3) is described by reference to a flow chart shown in FIG. 5.

In Step 21, in order to check the operating mode of each node 30, 40, 50 or 60, the microcomputer 20c captures signals from the microcomputer 10c through the communication line 9a. The microcomputer 20c demands the microcomputer 10c of the master 10C through the communication line 9a to transmit the signals of whether or not each node 30, 40, 50 or 60 is in sleep mode, sent from each of them to the microcomputer 10c by communication through the communication line 21. Then, it goes to Step 22, wherein it judges whether or not at least one of the nodes 30–60 is in sleep mode. When at least one of the nodes 30–60 is judged to be in sleep mode in Step 22, it goes to Step 23, wherein the inhibition of the charging of the auxiliary battery 15 is conducted and then finished. On the other hand, when none of the nodes 30–60 are judged to be in sleep mode in Step 22, it goes to Step 24, wherein the permission of the charging of the auxiliary battery 15 is conducted and then finished.

The timing chart of the permission/inhibition of the charging of the auxiliary battery 15 in this case is shown in FIG. 6(c). $T_{31}$ indicates the instant when at least one of the multiple nodes 30–60 was judged to be in sleep mode, since when the charge of the auxiliary battery 15 has been inhibited. Compared with FIG. 6(a) wherein the instant is when the master 10 goes into sleep mode and FIG. 6(b) wherein the instant is when the sleep conditions of the master 10B are satisfied, the charge of the auxiliary battery 15 is inhibited at an earlier timing. $T_{32}$ indicates the instant when all of the nodes 30–60 shifted from the sleep mode to wake-up mode, and an operation condition occurred, since when the charge of the auxiliary battery 15 has been permitted. Compared with FIG. 6(a) wherein the instant is when the master 10A goes into wake-up mode and FIG. 6(b) wherein the instant is when an operation condition occurred to the master 10B, the charge of the auxiliary battery 15 is permitted at a later timing.

Using the battery charge and discharge system according to the embodiment (3), the slave 20C receives the judgment of whether or not each node 30, 40, 50 or 60 connected through the communication line 21 with the master 10C is in sleep mode from the microcomputer 10c through the communication line 9a, and controls the permission/inhibition of the charging of the auxiliary battery 15. Therefore, a wiring for capturing signals (a signal wiring 14 shown in FIG. 7) and a signal detecting circuit component for detecting signals (an ignition detecting circuit 12 shown in FIG. 7), conventionally required for directly judging the state of an ignition key switch on the slave 20C side, become needless. As a result, the count of components constituting the system can be decreased, leading to a cost reduction. Moreover, by receiving at an early stage a signal indicating that the communication system including the multiple nodes 30–60 is shifting to sleep mode while the master 10C itself is in action, the charge of the auxiliary battery 15 can be inhibited at an earlier timing. And at the wake-up time of the master 10C, the charge of the auxiliary battery 15 is not permitted until all of the nodes 30–60 are actuated, so that the power consumption of the main battery 7 can be further reduced.

Here, as a master 10A, 10B or 10C, and a slave 20A, 20B or 20C, those related to a security system are exemplified in the above embodiments, but the present invention is not limited to the above embodiments. The present invention is applicable and advantageous to any system wherein a master and a slave with an auxiliary battery mounted thereon are communicably connected. For example, it can be applied to an emergency call system or the like.

INDUSTRIAL APPLICABILITY

A battery charge and discharge system according to the present invention is applicable to any system wherein a master and a slave with an auxiliary battery mounted thereon are communicably connected, and as a system with an auxiliary battery mounted thereon, which charges and discharges the auxiliary battery, a vehicle security system, an emergency call system, and the like are exemplified.

What is claimed is:

1. A battery charge and discharge system which controls the charge and discharge of an auxiliary battery installed separately from a main battery,
   wherein a master and a slave are communicably connected, and the auxiliary battery is mounted on the slave, the system comprising:
   a judging means for judging whether or not the master is in sleep mode;
   a charge inhibit means for inhibiting the charging of the auxiliary battery of the slave when the master is judged to be in sleep mode by the judging means; and
   a charge permit means for permitting the charging of the auxiliary battery of the slave when the master is not judged to be in sleep mode by the judging means.

2. A battery charge and discharge system which controls the charge and discharge of an auxiliary battery installed separately from a main battery,
   wherein a master and a slave are communicably connected, and the auxiliary battery is mounted on the slave, the system comprising:
   a judging means for judging whether or not sleep conditions of the master are satisfied;
   a charge inhibit means for inhibiting the charging of the auxiliary battery of the slave when the sleep conditions of the master are judged to be satisfied by the judging means; and
   a charge permit means for permitting the charging of the auxiliary battery of the slave when the sleep conditions of the master are not judged to be satisfied by the judging means.

3. A battery charge and discharge system which controls the charge and discharge of an auxiliary battery installed separately from a main battery,
   wherein a master and multiple nodes are connected through a communication line; and
   the master and a slave are communicably connected, and the auxiliary battery is mounted on the slave, the system comprising:
      a judging means for judging whether or not at least one of the nodes is in sleep mode;
      a charge inhibit means for inhibiting the charging of the auxiliary battery of the slave when at least one of the nodes except for the master is judged to be in sleep mode by the judging means; and
      a charge permit means for permitting the charging of the auxiliary battery of the slave when none of the nodes except for the master are judged to be in sleep mode by the judging means.

4. A battery charge and discharge system according to claim 1, wherein the auxiliary battery is used as a driving power when the electric power supply from the main battery is cut off.

5. A battery charge and discharge system according to claim 2, wherein the auxiliary battery is used as a driving power when the electric power supply from the main battery is cut off.

6. A battery charge and discharge system according to claim 3, wherein the auxiliary battery is used as a driving power when the electric power supply from the main battery is cut off.

7. A battery charge and discharge system for use with a main battery, said system comprising:
   a master unit having a sleep mode; and
   a slave unit operable to communicate with said master unit, said slave unit comprising:
      an auxiliary battery;
      a computer operable to judge whether or not said master unit is in the sleep mode and to output an indicating signal indicative of whether or not said master unit is in the sleep mode;
      a switch circuit operable to: receive the indicating signal from said computer; inhibit charging of said auxiliary battery by the main battery when the indicating signal indicates that the master unit is in the sleep mode; and permit charging of said auxiliary battery by the main battery when the indicating signal indicates that said master unit is not in the sleep mode.

8. A battery charge and discharge system according to claim 7, wherein said auxiliary battery provides driving power when electric power from the main battery is cut off.

9. A battery charge and discharge system for use with a main battery, said system comprising:
   a master unit having a sleep mode into which said master unit shifts after sleep conditions are satisfied; and
   a slave unit operable to communicate with said master unit, said slave unit comprising:
      an auxiliary battery;
      a computer operable to judge whether or not the sleep conditions of said master unit are satisfied and to output an indicating signal indicative of whether or not the sleep conditions of said master unit are satisfied;
      a switch circuit operable to: receive the indicating signal from said computer; inhibit charging of said auxiliary battery by the main battery when the indicating signal indicates that the sleep conditions of said master unit are satisfied; and permit charging of said auxiliary battery by the main battery when the indicating signal indicates that the sleep conditions of said master unit are not satisfied.

10. A battery charge and discharge system according to claim 9, wherein said auxiliary battery provides driving power when electric power from the main battery is cut off.

11. A battery charge and discharge system accord to claim 9, wherein said master unit shifts into the sleep mode a time period after the sleep conditions are satisfied.

12. A battery charge and discharge system for use with a main battery, said system comprising:
   a communication line;
   plural nodes;
   a master unit having a sleep mode, wherein said master unit and said nodes are connected via said communication line; and
   a slave unit operable to communicate with said master unit, said slave unit comprising:
      an auxiliary battery;
      a computer operable to judge whether or not at least one of said nodes is in the sleep mode and to output an indicating signal indicative of whether or not at least one of said nodes is in the sleep mode;
      a switch circuit operable to: receive the indicating signal from said computer; inhibit charging of said auxiliary battery by the main battery when the indicating signal indicates that at least one of said nodes is in the sleep mode; and permit charging of said auxiliary battery by the main battery when the indicating signal indicates that none of said nodes is in the sleep mode.

13. A battery charge and discharge system according to claim 12, wherein said auxiliary battery provides driving power when electric power from the main battery is cut off.

* * * * *